3,061,586
STABILIZATION OF RUBBER
Ralph B. Thompson, Hinsdale, Ill., assignor to Universal Oil Products Company, Des Plaines, Ill., a corporation of Delaware
No Drawing. Filed Dec. 30, 1959, Ser. No. 862,758
13 Claims. (Cl. 260—45.95)

This is a continuation-in-part of application Serial No. 707,693, filed January 8, 1958, now Patent No. 3,017,422, and relates to the stabilization of rubber against cracking due to ozone.

The presence of ozone in the atmosphere appears to be increasing, particularly in certain localities. This increase in ozone concentration in the atmosphere results in an increase in the ozone cracking of rubber. The present invention is directed to a novel method of retarding and/or preventing such cracking.

The present invention is particularly applicable to the stabilization of natural rubber. Natural rubber generally is regarded as comprising naturally occurring isoprene polymers. The natural rubbers include Hevea rubber, caoutchouc, balata, gutta-percha, etc. Although natural rubber appears to have better tear resistance during normal service than synthetic rubber, the natural rubber does undergo ozone cracking and, in unusual service or long periods of service, does fail of ozone cracking. Furthermore, the presence of cracks in rubber products also is objectionable for aesthetic reasons. Customers and users of rubber products object to the unsightly cracks in the rubber and, therefore, it is important that such cracks be avoided.

While the present invention is particularly applicable for use in natural rubber, it is understood that the invention can be utilized for preventing ozone cracking in synthetic rubber. Much of the synthetic rubber now being produced commercially is known in the art as GR–S rubber and is a copolymer of butadiene and styrene. Other synthetic rubbers include those produced from butadiene and acrylonitrile (Buna-N), butadiene and isobutylene (butyl rubber), etc. Still other synthetic rubbers include Thiokol rubber, silicone rubber, neoprene rubber, etc.

In one embodiment, the present invention relates to a method of preventing the cracking of rubber due to ozone which comprises incorporating therein a stabilizing concentration of an additive of the following general structure:

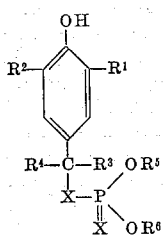

where $R^1$, $R^2$, $R^3$, $R^4$, $R^5$ and $R^6$ are selected from the group consisting of hydrogen and alkyl groups and X is selected from the group consisting of oxygen and sulfur.

The inhibitor for use in the present invention is prepared by the reaction of a quinone methide with a phosphoric acid or dithiophosphoric acid, and may be illustrated by the following general equation:

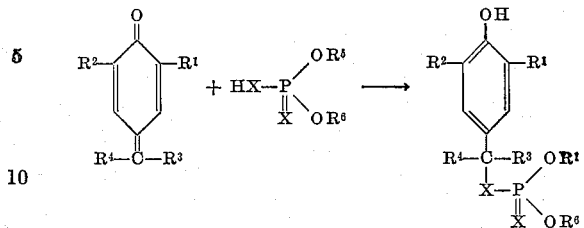

in which the symbols $R^1$ through $R^6$ have the same significance as indicated above.

Any suitable quinone methide may be used in preparing the inhibitor. While these compounds may be named as quinone methides, they also may be named as 4-alkylidene-2,5-cyclohexadiene-1-one. Thus, for example, a compound in which $R^1$ and $R^2$ are tertiary butyl groups and $R^3$ and $R^4$ are methyl groups may be named 2,6-di-tert-butyl-4-isopropylidene quinone methide. This compound also may be named 2,6-di-tert-butyl-4-isopropylidene-2,5-cyclohexadiene-1-one. The latter terminology appears preferred and, accordingly, will be used in the present specification and claims.

The preferred quinone methide for use as a reactant in the present invention comprises one in which $R^1$ and $R^2$ are tertiary alkyl groups and $R^3$ and $R^4$ are alkyl groups. Where $R^3$ and $R^4$ are methyl groups, preferred quinone methides include 2,6-di-tert-butyl-4-isopropylidene-2,5-cyclohexadiene-1-one, 2,6-di-tert-amyl-4-isopropylidene-2,5-cyclohexadiene-1-one, 2,6-di-tert-hexyl-4-isopropylidene-2,5-cyclohexadiene-1-one, 2,6-di-tert-heptyl-4-isopropylidene-2,5-cyclohexadiene-1-one, 2,6-di-tert-octyl-4-isopropylidene-2,5-cyclohexadiene-1-one, etc. In general it is preferred that both tertiary alkyl groups are the same although, in some cases, they may be different as, for example, in compounds including 2-tert-butyl-6-amyl-4-isopropylidene-2,5-cyclohexadiene-1-one, etc., 2-tert-amyl-6-tert-hexyl-4-isopropylidene-2,5-cyclohexadiene-1-one, etc. As hereinbefore set forth, it is preferred that $R^1$ and $R^2$ are tertiary alkyl groups. However, in some cases, these may be secondary or primary alkyl groups and will includes compounds as 2,6-diisopropyl-4-isopropylidene-2,5-cyclohexadiene-1-one, 2,6-di-sec-butyl-4-isopropylidene-2,5-cyclohexadiene-1-one, 2,6-dimethyl-4-isopropylidene-2,5-cyclohexadiene-1-one, 2,6-diethyl-4-isopropylidene-2,5-cyclohexadiene-1-one, 2-methyl-6-tert-butyl-4-isopropylidene-2,5-cyclohexadiene-1-one, 2-methyl-6-sec-butyl-4-isopropylidene-2,5-cyclohexadiene-1-one, 2-methyl-6-n-butyl-4-isopropylidene-2,5-cyclohexadiene-1-one, 2-methyl-6-isopropyl-4-isopropylidene-2,5-cyclohexadiene-1-one, etc.

While quinone methides having an isopropylidene group in the 4-position are preferred, it is understood that compounds having other alkylidene groups may be employed including, for example, such groups as methylidene, ethylidene, 1-propylidene, butylidene, pentylidene, hexylidene, heptylidene, octylidene, etc. It is understood that the various quinone methides which may be used as a reactant are not necessarily equivalent and also that two or more quinone methides may be employed.

Any suitable phosphoric acid or thiophosphoric acid and preferably alkyl substituted acids may be employed in preparing the inhibitor of the present invention. Alkyl and preferably dialkyl dithiophosphoric acids are employed. Dialkyl dithiophosphoric acids include diisopropyl dithiophosphoric acid, dibutyl dithiophosphoric acid, diamyl dithiophosphoric acid, dihexyl dithiophosphoric acid, diheptyl dithiophosphoric acid, dioctyl dithiophosphoric acid, dinonyl dithiophosphoric acid, didecyl dithiophosphoric acid, diundecyl dithiophosphoric acid, didodecyl dithiophosphoric acid, ditridecyl dithiophosphoric acid, ditetradecyl dithiophosphoric acid, dipentadecyl dithiophosphoric acid, dihexadecyl dithiophosphoric acid, diheptadecyl dithiophosphoric acid, dioctadecyl dithiophosphoric acid, dinonadecyl dithiophosphoric acid, dieicosyl dithiophosphoric acid, etc. Conveniently, these alkyl groups are introduced through the use of fatty alcohols and thus the alkyl groups may be selected from capryl, lauryl, myristyl, palmityl, stearyl, cetyl, etc. It is understood that the alkyl groups may be straight or branched chain, that the alkyl groups may be primary, secondary or tertiary substituents, and that $R^5$ and $R^6$ may comprise the same or different alkyl groups. Monoalkyl dithiophosphoric acids, when employed, preferably comprise those in which the alkyl group is selected from those hereinbefore set forth.

In another embodiment of the invention alkyl or dialkyl phosphoric acids are utilized in preparing the inhibitor of the present invention. Illustrative alkyl phosphoric acids include isopropyl phosphoric acid, diisopropyl phosphoric acid, butyl phosphoric acid, dibutyl phosphoric acid, pentyl phosphoric acid, dipentyl phosphoric acid, hexyl phosphoric acid, dihexyl phosphoric acid, heptyl phosphoric acid, diheptyl phosphoric acid, octyl phosphoric acid, dioctyl phosphoric acid, nonyl phosphoric acid, dinonyl phosphoric acid, decyl phosphoric acid, didecyl phosphoric acid, undecyl phosphoric acid, diundecyl phosphoric acid, dodecyl phosphoric acid, didodecyl phosphoric acid, tridecyl phosphoric acid, ditridecyl phosphoric acid, pentadecyl phosphoric acid, dipentadecyl phosphoric acid, hexadecyl phosphoric acid, dihexadecyl phosphoric acid, heptadecyl phosphoric acid, diheptadecyl phosphoric acid, octadecyl phosphoric acid, dioctadecyl phosphoric acid, nonadecyl phosphoric acid, dinonadecyl phosphoric acid, eicosyl phosphoric acid, dieicosyl phosphoric acid, etc. Here again, it is understood that, in the dialkyl phosphoric acids, the alkyl groups may be the same or different.

When desired, a mixture of the mono- and/or dialkyl phosphoric acids and/or mono- and/or dialkyl dithiophosphoric acid may be employed. In some cases these are recovered as a mixture and may be used in the present invention without the added cost of separating the individual compounds. For example, a mixture of mono- and dioctyl phosphoric acids is available commercially, generally at a lower cost than the individual compounds, and may be used in the present invention. It is understood that the various phosphates which may be used in preparing the inhibitor of the present invention are not necessarily equivalent but generally will be selected with reference to the specific rubber in which it is to be used.

Referring to the general structure hereinbefore set forth, it will be noted that the final product contains an aromatic ring. The substituted quinone aromatizes readily and thus the final product will contain the aromatic configuration. Accordingly, the reaction of the present invention may be considered as an addition-rearrangement type.

The reaction of the quinone methide and phosphoric or thiophosphoric acid is effected in any suitable manner. The reaction is exothermic and preferably is controlled by effecting the same in the presence of an inert solvent. Any suitable solvent may be employed, an aromatic hydrocarbon being particularly preferred. The aromatic hydrocarbons include benzene, toluene, xylene, ethylbenzene, cumene, etc. Other solvents include saturated aliphatic esters, as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The specific temperature of reaction will depend upon whether a solvent is employed and, when used, upon the particular solvent. In general, the temperature may range from about $-20°$ C. to about $100°$ C. and in some cases up to $150°$ C., although temperatures outside of this range may be employed, depending upon the specific reactants and solvents utilized.

The reaction normally may be effected in the absence of a catalyst. In some cases, it is preferred to use a catalyst, and any suitable catalyst may be employed. Illustrative catalysts include anhydrous hydrogen chloride, p-toluene sulfonic acid, piperidine, etc.

From the equation hereinbefore set forth, it will be noted that one mole equivalent of quinone methide reacts with one mole equivalent of phosphoric acid or thiophosphoric acid. As hereinbefore set forth, a mixture of quinone methide or a mixture of phosphoric acids may be employed. The product will contain a mixture of compounds. However, for most cases, the mixed product is satisfactory for use as an inhibitor in rubber and thus may be so employed without incurring the additional expense of separating individual compounds.

The inhibitors of the present invention are quinone methide phosphates and quinone methide dithiophosphates. Thus the reaction may be described as the addition of one mole of a phosphoric acid, preferably a dialkyl phosphoric acid, or one mole of a dithiophosphoric acid, preferably a dialkyl dithiophosphoric acid, to one mole of a 4-alkylidene-2,5-cyclohexadiene-1-one. A specific illustration is the addition of diisopropyl dithiophosphoric acid to 2,6-di-tert-butyl-4-isopropylidene-2,5-cyclohexadiene-1-one to prepare S-3,5-di-tert-butyl-4-hydroxy-alpha,alpha-dimethylbenzyl - O,O - diisopropyl dithiophosphate. Other specific preferred compounds include S-3,5-di-tert-pentyl-4-hydroxy-alpha,alpha-dimethylbenzyl - O,O - diisopropyl dithiophosphate, S-3,5-di-tert - hexyl - 4 - hydroxy-alpha,alpha-O,O-diisopropyl dithiophosphate, S-3,5-di-tert-heptyl-4-hydroxy-alpha,alpha-O,O-diisopropyl dithiophosphate, S-3,5-di-tert-octyl-4-hydroxy-alpha,alpha-O,O-diisopropyl dithiophosphate, etc., S-3,5-di-tert-butyl-4-hydroxy-alpha-methyl-alpha-ethylbenzyl - O,O - diisopropyl dithiophosphate, S-3,5-di-tert-butyl - 4 - hydroxy-alpha,alpha-diethyl-O,O-diisopropyl dithiophosphate, S-3,5-di-tert-butyl-4-hydroxy-alpha-methyl-alpha-propyl-O,O-diisopropyl dithiophosphate, S-3,5-di-tert-butyl-4-hydroxy-alpha-alpha-dipropyl-O,O-diisopropyl dithiophosphate, etc., S-3,5-di-tert-butyl-4-hydroxy-alpha,alpha-dimethylbenzyl-O,O - dibutyl dithiophosphate, S-3,5-di-tert-butyl-4-hydroxy-alpha,alpha-dimethylbenzyl-O,O-di-pentyl dithiophosphate, S-3,5-di-tert-butyl-4-hydroxy-alpha,alpha-dimethylbenzyl-O,O-di-hexyl dithiophosphate, S-3,5-di-tert-butyl-4-hydroxy-alpha,alpha-dimethylbenzyl - O,O - di - heptyl dithiophosphate, S-3,5-di-tert-butyl-4-hydroxy-alpha,alpha-dimethylbenzyl-O,O-di-octyl dithiophosphate, S-3,5-di-tert-butyl-4-hydroxy-alpha,alpha-dimethylbenzyl-O,O-di-lauryl dithiophosphate, S-3,5-di-tert-butyl - 4 - hydroxy-alpha,alpha-dimethylbenzyl-O,O-di-stearyl dithiophosphate, etc. It is understood that these specific compounds are listed for illustrative purposes only and are not intended to limit the scope of the present invention thereto.

The inhibitor of the present invention is recovered as a viscous liquid or solid. It may be marketed as such or as a solution in a suitable solvent including, for example, saturated paraffinic hydrocarbons including pentane, hexane, heptane, octane, etc., aromatic hydrocarbons including benzene, toluene, xylene, cumene, etc., alcohols, ketones, etc.

The concentration of inhibitor will depend upon the particular rubber in which it is to be used. In general the inhibitor will be utilized in a concentration of from about 0.25% to about 10% and more particularly from about 2% to about 5% by weight of the rubber hydrocarbon. These concentrations are based on the rubber hydrocarbon, exclusive of the other components of the final rubber composition, and are used in this manner in the present specification and claims. It is understood that the inhibitor of the present invention is utilizable along with other additives incorporated in rubber for specific purposes including, for example, antioxidants, accelerators, softeners, extenders, wax, reinforcing agents, etc.

The inhibitor of the present invention also possesses antioxidant properties and, therefore, will serve to prevent both cracking due to ozone and deterioration due to oxygen. However, in many cases, it is desirable to employ a separate antioxidant and, in such cases, the inhibitor of the present invention is employed along with a separate antioxidant. Any suitable antioxidant may be employed including, for example, phenyl-beta-naphthylamine, 6-phenyl-2,2,4 - trimethyl - 1,2 - dihydroquinoline, marketed under the trade name of "Santoflex-B," 2,2'-methylene-bis-(4-methyl-6-tert-butyl-phenol), 2,6-di-tert-butyl-p-cresol, the reaction product of acetone and diphenylamine, marketed under the trade name of "B.L.E.," etc. These antioxidants generally are used in a concentration from about 0.5% to about 3% by weight of the rubber.

The inhibitor of the present invention also normally is employed along with paraffin and/or micro-crystalline wax. The wax generally is utilized in a concentration of from about 0.5% to about 3% by weight of the rubber.

In one embodiment, the inhibitor of the present invention is admixed with the antioxidant and/or wax, and the mixture then is composited with one or more of the other components of the rubber composition.

The inhibitor of the present invention is incorporated in rubber or rubbery products in any suitable manner and at any suitable stage of preparation. When the inhibitor is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a paste, etc.

It is understood that the inhibitor can be utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the inhibitor of the present invention can be used in reclaims and latices of rubbery materials, whether or not admixed with fillers, pigments, accelerating agents, etc. In another embodiment the present invention can be utilized for the stabilization of adhesives, elastomers, etc. which tend to crack due to ozone.

The following examples are introduced to illustrate further the novelty and utility of the present invention but not with the intention of unduly limiting the same.

*Example I*

This example illustrates the reaction of 2,6-di-tert-butyl-4-isopropylidene-2,5-cyclohexadiene-1-one with diisopropyl dithiophosphoric acid. Equal molar quantities of the quinone methide and the diisopropyl dithiophosphoric acid were dissolved in a hexane solvent and the solution was saturated with anhydrous hydrogen chloride. Upon warming on a steam bath, the yellow color of the quinone methide disappeared. The reaction mixture was poured into water, washed with dilute sodium bicarbonate and the solvents were removed by evaporating under vacuum. The product was recovered as a yellow-green liquid and is S-3,5-di-tert-butyl-4 - hydroxy - alpha,alpha-dimethylbenzyl - O,O-diisopropyl dithiophosphate. The calculated analysis for sulfur and phosphorus are 13.91% and 6.74%, respectively. Actually found are 12.90% sulfur and 6.65% phosphorus.

*Example II*

The inhibitor prepared according to Example I was evaluated as an antiozonant in white rubber. A sample of the rubber without this additive and a sample of the rubber containing one percent by weight of this additive each were subjected to evaluation in an ozone cabinet. The samples were elongated 20% and mounted on a board and then were exposed to an atmosphere containing 25 parts of ozone per 100 million parts of air at 100° F. The sample of rubber without additive showed cracks within 4 hours of exposure in the ozone cabinet. On the other hand, the sample of rubber containing the additive was substantially free from cracks after 24 hours of exposure in the ozone cabinet. Furthermore, this additive accelerated curing of the rubber and, therefore, the amount of accelerating agent normally added to rubber may be decreased accordingly.

*Example III*

The dialkyl dithiophosphoric acid used in this example is capryl stearyl dithiophosphoric acid. An equal molar equivalent of this dialkyl dithiophosphoric acid was reacted with an equal molar equivalent of 2,6-di-tert-butyl-4-isopropylidene-2,5 - cyclohexadiene-1-one in substantially the same manner as described in Example I. The product is S-3,5-di-tert-butyl-4-hydroxy-alpha,alpha-dimethylbenzyl-O-capryl - O-stearyl dithiophosphate and was recovered as a yellow-green liquid. This product is incorporated in black natural rubber in a concentration of 2% by weight of the rubber hydrocarbon and serves to retard cracking of the rubber due to ozone.

*Example IV*

Equal molar quantities of 2,6-di-tert-butyl-4-methylidene-2,5-cyclohexadiene-1-one and a mixed mono- and dioctyl orthophosphoric acid were dissolved in a hexane solvent and the solution was saturated with anhydrous hydrogen chloride. Following the initial reaction, the reaction mixture was heated for 4 hours on a steam bath to complete the reaction, after which the solvent was removed by distillation under vacuum. The product is a mixture of O-3,5-di-tert - butyl-4-hydroxy-alpha,alpha-dimethylbenzyl-O-octyl-phosphate and O-3,5-di-tert-butyl-4 - hydroxy - alpha,alpha - dimethylbenzyl-O,O-dioctyl phosphate. The individual phosphates may be recovered from the mixture if desired. However, as hereinbefore set forth, the mixture may be used as such and this expensive and complicated separation may be avoided. The mixture prepared in the above manner is utilized in a concentration of 3% by weight in GR–S rubber and serves to retard cracking thereof due to ozone.

I claim as my invention:

1. Natural rubber normally subject to cracking due to ozone containing from about 0.25% to about 10% by weight of an inhibitor of the following general structure:

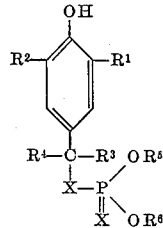

where $R^1$, $R^2$, $R^3$, $R^4$, $R^5$ and $R^6$ are selected from the group consisting of hydrogen and alkyl groups and X is selected from the group consisting of oxygen and sulfur.

2. Natural rubber, normally subject to cracking due to ozone containing from about 0.25% to about 10% by weight of S-3,5-di-tert-butyl-4 - hydroxy-alpha,alpha-dimethylbenzyl-O,O-diisopropyl dithiophosphate.

3. Natural rubber, normally subject to cracking due to ozone containing from about 0.25% to about 10% by weight of S-3,5-di-tert-butyl-4-hydroxy-alpha,alpha-dimethylbenzyl-O-capryl-O-stearyl dithiophosphate.

4. Natural rubber normally subject to cracking due to ozone containing from about 0.25% to about 10% by weight of S-3,5-di-tert-butyl-4-hydroxy-alpha,alpha-dimethylbenzyl-O,O-dioctyl dithiophosphate.

5. Natural rubber normally subject to cracking due to ozone containing from about 0.25% to about 10% by weight of O-3,5-di-tert-butyl-4-hydroxy-alpha,alpha-dimethylbenzyol-O,O-dioctyl phosphate.

6. Natural rubber subject to cracking due to ozone containing from about 0.25% to about 10% by weight of O-3,5-di-tert-butyl-4-hydroxy-alpha,alpha-dimethylbenzyl-O,O-diisophopyl phosphate.

7. A rubber normally subject to cracking due to ozone containing from about 0.25% to about 10% by weight of an inhibitor having the following general structure:

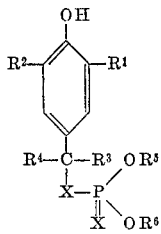

where $R^1$, $R^2$, $R^3$, $R^4$, $R^5$ and $R^6$ are selected from the group consisting of hydrogen and alkyl groups and X is selected from the group consisting of oxygen and sulfur.

8. A rubber normally subject to cracking due to ozone containing from about 0.25% to about 10% by weight of S-3,5-di-tert-butyl-4-hydroxy-alpha,alpha-dimethylbenzyl diisopropyl dithiophosphate.

9. A rubber normally subject to cracking due to ozone containing from about 0.25% to about 10% by weight of S-3,5-di-tert-butyl-4-hydroxy-alpha,alpha-dimethylbenzyl-O-capryl-O-stearyl dithiophosphate.

10. A rubber normally subject to cracking due to ozone containing from about 0.25% to about 10% by weight of S-3,5-di-tert-butyl-4-hydroxy-alpha,alpha-dimethylbenzyl-O,O-dioctyl phosphate.

11. A rubber normally subject to cracking due to ozone containing from about 0.25% to about 10% by weight of O-3,5-di-tert-butyl-4-hydroxy-alpha,alpha-dimethylbenzyl-O,O-dioctyl phosphate.

12. A rubber normally subject to cracking due to ozone containing from about 0.25% to about 10% by weight of O-3,5-di-tert-butyl-4-hydroxy-alpha,alpha-dimethylbenzyl-O,O-diisopropyl phosphate.

13. A composition as defined in claim 7 further characterized in that said rubber is a co-polymer of butadiene and styrene.

References Cited in the file of this patent
UNITED STATES PATENTS

| | | |
|---|---|---|
| 2,415,833 | Mikeska et al. | Feb. 18, 1947 |
| 2,530,339 | Mikeska et al. | Nov. 14, 1950 |
| 2,587,477 | Hunter | Feb. 26, 1952 |
| 2,589,675 | Cook et al. | Mar. 18, 1952 |